United States Patent
Singh et al.

(10) Patent No.: US 6,573,342 B2
(45) Date of Patent: Jun. 3, 2003

(54) SOLID POLYMER DISPERSIONS AND METHOD FOR THEIR PREPARATION

(75) Inventors: Navjot Singh, Hastings-on-Hudson, NY (US); Joseph Michael Anostario, Albany, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/079,730

(22) Filed: Feb. 21, 2002

(65) Prior Publication Data

US 2002/0115794 A1 Aug. 22, 2002

Related U.S. Application Data

(63) Continuation-in-part of application No. 09/696,088, filed on Oct. 26, 2000, now abandoned, which is a division of application No. 09/218,925, filed on Dec. 22, 1998, now Pat. No. 6,194,518, which is a continuation-in-part of application No. 08/959,256, filed on Oct. 29, 1997, now abandoned, which is a continuation-in-part of application No. 08/742,536, filed on Nov. 1, 1996, now abandoned.

(51) Int. Cl.$^7$ ...................... C08F 283/00; C08F 283/12; C08G 77/00; C08G 77/38; C08L 83/00

(52) U.S. Cl. ........................ 525/474; 523/201; 523/206; 523/209; 525/534

(58) Field of Search ................. 525/474, 534; 523/201, 206, 209

(56) References Cited

U.S. PATENT DOCUMENTS 3,737,479 A * 6/1973 Haaf
5,929,168 A * 7/1999 Ikkala et al.

* cited by examiner

*Primary Examiner*—Patrick D. Niland
(74) *Attorney, Agent, or Firm*—Noreen C. Johnson; Christian G. Cabou

(57) ABSTRACT

Solid blends of rubbery polymers and amorphous or crystalline polymers, said blends being free-flowing at temperatures lower than the glass transition temperature or crystalline melting temperature of the amorphous or crystalline polymer, are prepared by intimate mixing procedures. In general, said mixing conditions include high shear conditions sufficient to convert polymer A to dispersed particles coated with polymer B and produce a free-flowing powder blend.

26 Claims, No Drawings

SOLID POLYMER DISPERSIONS AND METHOD FOR THEIR PREPARATION

CROSS REFERENCE TO RELATED APPLICATIONS

This application is a continuation-in-part of application Ser. No. 09/696,088, filed Oct. 26, 2000, now ABN which in turn is a division of application Ser. No. 09/218,925, filed Dec. 22, 1998, now U.S. Pat. No. 6,194,518, which in turn is a continuation-in-part of application Ser. No. 08/959,256, filed Oct. 29, 1997, now abandoned, which in turn is a continuation-in-part of application Ser. No. 08/742,536, filed Nov. 1, 1996, now abandoned, which are incorporated herein by reference.

BACKGROUND OF INVENTION

This invention relates to polymer dispersions in solid form and a method for their preparation. More particularly, it relates to the preparation of polymer blends in solid form.

The use of elastomeric (i.e., rubbery) polymers as additives in blends comprising other polymers is known. Various rubbery polymers are useful as impact modifiers, flame retardants and additives conferring other properties on blends in which they are incorporated. While the dispersion of liquid additives in polymeric powders is well known and previously documented by Dahms et al. (U.S. Pat. No. 3,301,813), a uniform and fine dispersion of rubbery polymers in thermoplastics to form dry free-flowing powders has not been reported.

U.S. Pat. Nos. 3,824,208, 5,153,238, 5,391,594 and 5,412,014 describe the incorporation of fillers such as silica in rubbery polymers to form compositions which exist as free-flowing particles. However, it is sometimes highly desirable to exclude inorganic materials such as silica from polymer blends or coat the surface of the silica particles with siloxane elastomers, in which case these compositions are no longer free-flowing. The surface chemistry of the filler in some cases can result in degradation of the matrix polymer.

Conventional approaches for obtaining free-flowing powders with elastomeric components include the use of block copolymers, core-shell copolymers or graft copolymers with thermoplastics. Copolymerization or grafting of glassy/crystalline thermoplastic prevents agglomeration of the rubbery component and enables convenient addition of these impact modifiers as free-flowing powders in extrusion equipment for melt processing. Such approaches however do not provide a cost effective solution for preparing free-flowing polymeric dispersions.

It is difficult, however, to prepare homogeneous blends of rubbery polymers with other resins, owing to the relative intractabilities of said rubbery polymers and the slow progress of dispersion of said polymer in the blend. Examples of some alternative approaches for obtaining free-flowing powders include mixing a dispersion of an organic thermoplastic polymer with an emulsion of a silicone resin as taught by Fuhr et al. in U.S. Pat. No. 5,100,958. This method is once again not cost effective since it involves a subsequent adjustment of pH for coagulation followed by isolation and drying of the coagulate. Another method proposed by Vaughn in U.S. Pat. No. 4,153,639 involves mixing the resin and the rubbery additive (in this case silicone gum) in a liquid medium having a component which vaporizes readily. The liquid medium is contacted with flowing live steam in a conduit and the mixture is fed into a closed chamber from which the superheated, vaporized liquid components are removed and a particulate blend is extracted.

Other practical limitations in melt—melt blending of thermoplastics with rubbery polymers include the inability to disperse the rubber phase adequately in the thermoplastic melt using the conventional processing equipment due to excessive shear heating in the extruders and a morphological balance between drop break up (dispersion) and the subsequent coalescence of the dispersed particles.

Some applications like powder coating require the availability of the thermoplastic resin blend in a powdery form. One route for the formation of thermoplastic blend powders involves high temperature melt extrusion of the various melt components followed by grinding of the thermoplastic pellets to obtain a free-flowing powder. The ability to directly form uniform thermoplastic blends with fine morphologies at lower processing temperatures can provide a direct, cost-effective and simpler process.

SUMMARY OF INVENTION

The present invention facilitates the formation of polymer blends as described herein above. In particular, it makes it possible to prepare blends which are solid and free-flowing, said blends comprising high and often major proportions of rubbery materials such as polyorganosiloxanes and synthetic elastomers, said blends also containing another resinous constituent. Among the blends that can be produced are those useful as products in their own right and those useful as master batches suitable for incorporation as additives in other polymer compositions.

In one of its aspects, the present invention provides a method for preparing a blend, said blend comprising: a polyorganosiloxane (A) having at least one of a glass transition temperature ($Tg_a$) or a melting temperature ($Tm_a$), a polyphenylene ether (B) having at least one of a glass transition temperature ($Tg_b$) or melting temperature ($Tm_b$), wherein $Tg_a < Tg_b$ when polymers A and B are amorphous, $Tm_a < Tm_b$ when both polymers A and B are crystalline, $Tg_a < Tm_b$ when polymer A is amorphous and polymer B is crystalline, and $Tm_a < Tg_b$ when polymer A is crystalline and polymer B is amorphous, which comprises intimately mixing said polymers at a suitable temperature between the lower of $Tg_a$ and $Tm_a$ and the value of $Tg_b$, for a time and under shear conditions sufficient to convert polymer A to dispersed particles coated with polymer B and produce a free-flowing blend, said blend being free of silica filler and treated silica filler. Also provided is a composition prepared by the aforementioned method.

DETAILED DESCRIPTION

In some embodiments the present invention provides a method wherein $Tg_a$ is below about 160° C., in other embodiments below about 50° C., and in still other embodiments below about minus 100° C. In some embodiments the present invention provides a method wherein polymer B is crystalline. In still other embodiments the present invention provides a method wherein polymer B is amorphous and $Tg_b$ is above about 100° C. It is generally known to those skilled in the art that many, but not all, polymers as commonly obtained comprise a mixture of amorphous and crystalline fractions. In some particular polymers an amorphous phase predominates, while in other particular polymers a crystalline phase may provide a significant fraction of the total polymer. In other particular embodiments polymer A and polymer B are typically immiscible and incompatible with each other.

In various embodiments the present invention provides a method wherein polymer A is a polyorganosiloxane, an ethylene-propylene rubber, polybutadiene, polyisoprene, neoprene, an acrylic rubber, or copolymers thereof, and polymer B is an olefin polymer, a polycarbonate, poly(vinyl chloride), a linear polyester, a vinyl aromatic polymer, a polyphenylene ether, a polyimide, a polyethersulfone, a polyetherketone, a polyarylene sulfide, or copolymers thereof. In particular embodiments the present invention provides a method wherein polymer B is poly(2,6-dimethyl-1,4-phenylene ether), poly(butylene terephthalate), or polyetherimide.

Provided in yet another embodiment is a method wherein polymers A and B are mixed in a rotary blade mixer at a blade tip velocity in the range of about 1,000-15,000 cm/sec.

In another embodiment the instant invention provides a composition comprising a blend of polymer A having glass transition temperature ($Tg_a$) and/or a melting temperature ($Tm_a$), polymer B having glass transition temperature ($Tg_b$) or melting temperature ($Tm_b$), wherein $Tg_a<Tg_b$ when polymers A and B are amorphous, $Tm_a<Tm_b$ when both polymers A and B are crystalline, $Tg_a<Tm_b$ when polymer A is amorphous and polymer B is crystalline, and $Tm_a<Tg_b$ when polymer A is crystalline and polymer B is amorphous, said composition being produced by the process of intimately mixing said polymers at a suitable temperature between the lower of $Tg_a$ and $Tm_a$ and the higher of $Tg_b$ and $Tm_b$, for a time and under shear conditions sufficient to convert polymer A to dispersed particles coated with polymer B and produce a free-flowing blend in the form of a powder. In still another embodiment the instant invention provides a composition comprising a blend of polymer A having glass transition temperature ($Tg_a$) and/or a melting temperature ($Tm_a$), polymer B having glass transition temperature ($Tg_b$) or melting temperature ($Tm_b$), wherein $Tg_a<Tg_b$ when polymers A and B are amorphous, $Tm_a<Tm_b$ when both polymers A and B are crystalline, $Tg_a<Tm_b$ when polymer A is amorphous and polymer B is crystalline, and $Tm_a<Tg_b$ when polymer A is crystalline and polymer B is amorphous, said composition being produced by the process of intimately mixing said polymers at a suitable temperature between the lower of $Tg_a$ and $Tm_a$, and the value of $Tg_b$, for a time and under shear conditions sufficient to convert polymer A to dispersed particles coated with polymer B and produce a free-flowing blend in the form of a powder. In some particular embodiments the free-flowing blend is prepared by the method of the invention which does not involve melting of polymer B. In other particular embodiments polymer B may be plasticized, for example by mixing with at least one other polymer or additive which is at least partly miscible with polymer B such that the Tg of the mixture is lower than the Tg of polymer B itself, in which case the temperature range for preparing blends by the present method is at a suitable temperature between the lower of $Tg_a$ and $Tm_a$, and the value of Tg for the mixture of polymer B with at least one other polymer or additive which is at least partly miscible with polymer B. An example of a plasticized mixture of a polymer B is a mixture of a polyphenylene ether such as poly-2,6-dimethyl-1,4-phenylene ether with a polystyrene, which mixture typically has a Tg in between that of the polyphenylene ether and the polystyrene dependent upon, among other factors, the relative proportions of the two polymers in the mixture.

The free-flowing powders prepared by the method of the present invention have a mean particle size in one embodiment in a range of between about 50 microns and about 4000 microns, in another embodiment in a range of between about 100 microns and about 3000 microns, in another embodiment in a range of between about 200 microns and about 2000 microns, in another embodiment in a range of between about 200 microns and about 1500 microns, in another embodiment in a range of between about 250 microns and about 1200 microns, in another embodiment in a range of between about 300 microns and about 1000 microns, and in still another embodiment in a range of between about 400 microns and about 900 microns. In a particular embodiment a free flowing powder blend may be distinguished from a pelletized extrudate made in a melt process which pellets typically have at least one dimension greater than about 4000 microns.

In some embodiments the present invention provides a composition wherein $Tg_a$ is below about 160° C., in other embodiments below about 50° C., and in still other embodiments below about minus 100° C. In some embodiments the present invention provides a composition wherein polymer B is crystalline. In still other embodiments the present invention provides a composition wherein polymer B is amorphous and $Tg_b$ is above about 100° C.

In various embodiments the present invention provides a composition wherein polymer A is a polyorganosiloxane, an ethylene-propylene rubber, polybutadiene, polyisoprene, neoprene, an acrylic rubber, or copolymers thereof, and polymer B is an olefin polymer, a polycarbonate, poly(vinyl chloride), a linear polyester, a vinyl aromatic polymer, a polyphenylene ether, a polyimide, a. polyethersulfone, a polyetherketone, a polyarylene sulfide, or copolymers thereof. In particular embodiments the present invention provides a composition wherein polymer B is poly(2,6-dimethyl-1,4-phenylene ether), poly(butylene terephthalate), or polyetherimide.

Elastomeric examples of polymer A employed according to the present invention are those which have a relatively low glass transition temperature $Tg_a$. The value of $Tg_a$ is generally below about 25° C. and may be below 0° C. For example, polydiorganosiloxane gums useful in the invention may have Tg values down to about minus 127° C. with a melting point of about minus 40° C. Polymer A typically has a high viscosity, most often in the range of about 500,000 to about 20,000,000 centipoise at a shear rate on the order of 10 sec.$^{-1}$, however polymers having viscosities as low as 5,000 and above about 20,000,000 may also be used. In some embodiments examples of polymer A have a number average molecular weight of greater than about 10,000 and in other embodiments greater than about 20,000.

In various embodiments polymer A comprises at least one polyorganosiloxane, especially polydialkylsiloxanes such as polydimethylsiloxane and their fluorinated derivatives such as poly(trifluoropropylmethylsiloxane). However, other rubbery polymers including ethylene-propylene rubbers, polybutadiene, polyisoprene, neoprene (polychloroprene) and acrylic rubbers, such as poly(ethyl acrylate), poly (isobutyl acrylate) and poly(n-butyl acrylate) or copolymers thereof may also be employed.

Polymers useful as polymer B may be amorphous or crystalline. When amorphous, they are characterized by their $Tg_b$ value; when crystalline, the crystalline melting temperature ($Tm_b$) may be more significant. Thus, there is a temperature span which is above the glass transition temperature ($Tg_a$) or melting point ($Tm_a$) of polymer A and below the higher of the glass transition temperature ($Tg_b$) or crystalline melting temperature ($Tm_b$) of polymer B.

Illustrative polymers useful as polymer B include olefin polymers such as polyethylene and polypropylene, polycarbonates, poly(vinyl chloride), linear polyesters such as poly(ethylene terephthalate) and poly(butylene terephthalate), vinylaromatic polymers including polystyrene and styrene-acrylonitrile copolymers, polyphenylene ethers, polyimides (including polyetherimides), polyethersulfones, polyetherketones and polyarylene sulfides. In some embodiments polymers useful as polymer B are those having glass transition temperatures above about 150° C. In particular embodiments polymers useful as polymer B comprise polyphenylene ethers, such as, but not limited to, poly(2,6-dimethyl-1,4-phenylene ether) and poly (2,6-dimethyl-co-2,3,6 -trimethyl-1,4-phenylene ether).

The compositions of the invention may include additives such as fillers, plasticizers, compatibilizers, lubricants, UV screeners, flame retardants, antistatic agents, antioxidants, and the like. In particular embodiments compositions exclude inorganic fillers such as silica filler and treated silica filler.

In a particular embodiment of the invention, polymers A and B are mixed under high shear conditions, at a temperature higher than $Tg_a$ or $Tm_a$ and lower than the higher of $Tg_b$ and $Tm_b$. In another particular embodiment of the invention, polymers A and B are mixed under high shear conditions, at a temperature higher than $Tg_a$ or $Tm_a$ and lower than the value of $Tg_b$. Mixing is generally conducted in one or more discrete steps rather than continuously as in an extruder, and under high shear conditions sufficient to produce a composition of the type described hereinafter. High shear mixers of this type are known in the art and include Waring blenders, Henschel mixers, Drais mixers and mixer-granulators of the type manufactured by Littleford Bros., Florence, Ky.

In general, both polymers are charged in their entirety before mixing begins. It is within the scope of the invention, however, to add polymer A and polymer B incrementally, so as to maintain conditions under which a dispersion of polymer A in solid polymer B is formed.

It has been shown that initially, a dispersion of gum (polymer A) in solid (polymer B) is formed. During the high shear mixing process, a progressive breakdown of the particle size of polymer A occurs. Simultaneously, the particles of polymer B coat those of polymer A to form a solid, particulate blend which is a solid dispersion of polymer A in polymer B and which is free-flowing at temperatures below the higher of $Tg_b$ and $Tm_b$.

The proportions of polymers A and B, as well as the mixing time and conditions, are chosen to ensure that all particles of polymer A are dispersed and coated. If the mixing time is too long, polymer A will form particles so small that the quantity of polymer B will be inadequate to fully coat them, whereupon reagglomeration will take place immediately or upon storage.

Thus, suitable proportions and mixing conditions can be determined by simple experimentation. Weight ratios of polymer B to polymer A are in various embodiments in the range of about 1:1 to about 5:1. In the case of a rotary blade mixer, blade tip velocities in the range of about 1,500 to about 15,000 cm/sec are generally adequate to produce the required high shear mixing.

The blending temperature is not particularly critical. In one embodiment the blending temperature is between the lower of $Tg_a$ and $Tm_a$ and the higher of $Tg_b$ and $Tm_b$. In another embodiment the blending temperature is between the lower of $Tg_a$ and $Tm_a$ and the value of $Tg_b$. In a particular embodiment where $Tg_a$ is below about and $Tg_b$ or $Tm_b$ is above about 150° C., blending at moderate temperatures in the range of about 20° C. to about 75° C., and especially at ambient temperature of about 25° C., is satisfactory. In other embodiments, polyethylene with a Tm of about 10° C. may be employed as polymer A with a polyphenylene ether having a Tg of 210° C. as polymer B, if blending is at a temperature typically around 150° C. In various embodiments the blending temperature is below both $Tg_b$ and $Tm_b$.

Following the blending operation of the present invention, it is sometimes desirable to extrude and to pelletize the polymer blend of the invention to form a storable material. Depending on the constituents employed, this storable material may itself be a useful polymer composition or may be a master batch or an additive for incorporation into other polymer compositions.

Without further elaboration, it is believed that one skilled in the art can, using the description herein, utilize the present invention to its fullest extent. The following examples are included to provide additional guidance to those skilled in the art in practicing the claimed invention. The examples provided are merely representative of the work that contributes to the teaching of the present application. Accordingly, these examples are not intended to limit the invention, as defined in the appended claims, in any manner. All parts are by weight.

EXAMPLE 1

A mixture of 25 parts of a vinyl-terminated polydimethylsiloxane gum (Tg about minus 127° C. & Tm about minus 40° C.) having a viscosity of about 3.9 million centipoise at a shear rate of about 10.14 sec.$^{-1}$ and 100 parts of a poly(2,6-dimethyl-1,4-phenylene ether) having a $Tg_b$ of about 210° C. having an intrinsic viscosity of 0.4 dl/g (in chloroform at 25° C.) was mixed at room temperature (about 25° C.) in a Waring blender at high speed for 10 minutes. The desired blend was obtained as a free-flowing powder, with 2.36 parts of unblended silicone remaining. The blend was capable of being molded, as shown by a compression molding operation at 300° C. Mixing time and shear rate are critical for controlling the amount of unblended silicone.

EXAMPLE 2

The procedure of Example 1 was repeated, except that mixing was conducted in a Henschel mixer at a tip speed of 4,000 cm/s and ambient temperature. The product was a free-flowing powder capable of extrusion and molding with no detectable unblended silicone.

EXAMPLE 3

The procedure of Example 2 was employed to prepare a free-flowing powder of 4 parts of polyethylene powder ($Tm_b$ about 120° C., and $Tg_b$ about minus 80° C.) and part of methyl-stopped polydimethylsiloxane gum (Tg about minus 127° C. & Tm about minus 40° C.) having a viscosity of about 3,900,000 centipoise at 10.14 sec.$^{-1}$. The blend was capable of extrusion and molding.

EXAMPLE 4

The procedure of Example 3 was repeated, substituting 4 parts of polystyrene powder ($Tg_b$ about 100° C.) for the polyethylene powder. A similar product was obtained.

EXAMPLE 5

The procedure of Example 4 was repeated, substituting 4 parts of bisphenol A polycarbonate powder ($Tg_b$ about 162° C.) for the polyethylene powder. A similar product was obtained.

EXAMPLE 6

The procedure of Example 1 was repeated, using a blend of 1 part each of the polyphenylene ether ($Tg_b$ about 210° C.) and an ethylene-propylene rubber ($Tg_a$ about minus 80° C.). A well dispersed, free-flowing powder with a shelf life of at least one month was obtained. The blend was capable of extrusion and molding.

While the invention has been illustrated and described in typical embodiments, it is not intended to be limited to the details shown, since various modifications and substitutions can be made without departing in any way from the spirit of the present invention. As such, further modifications and equivalents of the invention herein disclosed may occur to persons skilled in the art using no more than routine experimentation, and all such modifications and equivalents are believed to be within the spirit and scope of the invention as defined by the following claims. All U.S. Patents and U.S. Patent applications cited herein are incorporated herein by reference.

What is claimed is:

1. A method for preparing a blend, said blend comprising:
   a polyorganosiloxane (A) having at least one of a glass transition temperature ($Tg_a$) or a melting temperature ($Tm_a$),
   a polyphenylene ether (B) having at least one of a glass transition temperature ($Tg_b$) or melting temperature ($Tm_b$), wherein
   $Tg_a<Tg_b$ when polymers A and B are amorphous,
   $Tm_a<Tm_b$ when both polymers A and B are crystalline,
   $Tg_a<Tm_b$ when polymer A is amorphous and polymer B is crystalline, and
   $Tm_a<Tg_b$ when polymer A is crystalline and polymer B is amorphous,
   which comprises intimately mixing said polymers at a suitable temperature between the lower of $Tg_a$ and $Tm_a$ and the value of $Tg_b$, for a time and under shear conditions sufficient to convert polymer A to dispersed particles coated with polymer B and produce a blend in the form of a free-flowing powder, said blend being free of silica filler and treated silica filler.

2. The method according to claim 1 wherein $Tg_a$ is below about 160° C.

3. The method according to claim 2 wherein $Tg_a$ is below about 50° C.

4. The method according to claim 3 wherein $Tg_a$ is below about minus 100° C.

5. The method according to claim 2 wherein polymer B is crystalline.

6. The method according to claim 3 wherein polymer B is amorphous and $Tg_b$ is above about 100° C.

7. The method according to claim 1 wherein the polyorganosiloxane comprises a polydimethylsiloxane.

8. The method according to claim 1 wherein the polyphenylene ether (B) comprises a poly(2,6-dimethyl-1,4-phenylene ether).

9. The method according to claim 1 wherein said polymers are mixed in a rotary blade mixer at a blade tip velocity in the range of about 1,000 to about 15,000 cm/sec.

10. The method of claim 1 wherein the polyorganosiloxane has a viscosity in a range between 5,000 and about 20,000,000 centipoise at a shear rate of about 10 $sec^{-1}$.

11. A method for preparing a blend, said blend consisting essentially of:
    a polyorganosiloxane (A) having at least one of a glass transition temperature ($Tg_a$) or a melting temperature ($Tm_a$),
    a poly-2,6-dimethyl-1,4-phenylene ether (B) having at least one of a glass transition temperature ($Tg_b$) or melting temperature ($Tm_b$), wherein
    $Tg_a<Tg_b$ when polymers A and B are amorphous,
    $Tm_a<Tm_b$ when both polymers A and B are crystalline,
    $Tg_a<Tm_b$ when polymer A is amorphous and polymer B is crystalline, and
    $Tm_a<Tg_b$ when polymer A is crystalline and polymer B is amorphous,
    which comprises intimately mixing said polymers at a suitable temperature between the lower of $Tg_a$ and $Tm_a$ and the value of $Tg_b$, for a time and under shear conditions sufficient to convert polymer A to dispersed particles coated with polymer B and produce a blend in the form of a free-flowing powder having a mean particle size in a range of between about 50 microns and about 4000 microns, said blend being free of silica filler and treated silica filler, and wherein weight ratios of polymer B to polymer A are in the range of about 1:1 to about 5:1.

12. A composition comprising a blend of:
    a polyorganosiloxane (A) having at least one of a glass transition temperature ($Tg_a$) or a melting temperature ($Tm_a$),
    a polyphenylene ether (B) having at least one of a glass transition temperature ($Tg_b$) or melting temperature ($Tm_b$), wherein
    $Tg_a<Tg_b$ when polymers A and B are amorphous,
    $Tm_a<Tm_b$ when both polymers A and B are crystalline,
    $Tg_a<Tm_b$ when polymer A is amorphous and polymer B is crystalline, and
    $Tm_a<Tg_b$ when polymer A is crystalline and polymer B is amorphous,
    produced by the process of intimately mixing said polymers at a suitable temperature between the lower of $Tg_a$ and $Tm_a$ and the value of $Tg_b$, for a time and under shear conditions sufficient to convert polymer A to dispersed particles coated with polymer B and produce a blend in the form of a free-flowing powder, said composition being free of silica filler and treated silica filler.

13. The composition according to claim 12 wherein $Tg_a$ is below about 160° C.

14. The composition according to claim 13 wherein $Tg_a$ is below about 50° C.

15. The composition according to claim 14 wherein the $Tg_a$ is below about minus 100° C.

16. The composition according to claim 12 wherein polymer B is crystalline.

17. The composition according to claim 14 wherein polymer B is amorphous and $Tg_b$ is above about 100° C.

18. The composition according to claim 12 wherein the polyorganosiloxane comprises a polydimethylsiloxane.

19. The composition according to claim 12 wherein the polyphenylene ether (B) comprises a poly(2,6-dimethyl-1, 4-phenylene ether).

20. The composition of claim 12 wherein said polymers are mixed in a rotary blade mixer at a blade tip velocity in the range of about 1,000 to about 15,000 cm/sec.

21. The composition of claim 12 wherein the polyorganosiloxane has a viscosity in a range between 5,000 and about 20,000,000 centipoise at a shear rate of about 10 $sec^{-1}$.

22. A composition consisting essentially of a blend of:
    a polyorganosiloxane (A) having at least one of a glass transition temperature ($Tg_a$) or a melting temperature ($Tm_a$), a poly-2,6-dimethyl-1,4-phenylene ether (B) having at least one of a glass transition temperature glass transition temperature ($Tg_b$) or a melting temperature ($Tm_b$), wherein $Tg_a < Tg_b$ when polymers A and B are amorphous,
$Tm_a < Tm_b$ when both polymers A and B are crystalline,
$Tg_a < Tm_b$ when polymer A is amorphous and polymer B is crystalline, and
$Tm_a < Tg_b$ when polymer A is crystalline and polymer B is amorphous, produced by the process of intimately mixing said polymers at a suitable temperature between the lower of $Tg_a$ and $Tm_a$ and the value of $Tg_b$, for a time and under shear conditions sufficient to convert polymer A to dispersed particles coated with polymer B and produce a blend in the form of a free-flowing powder having a mean particle size in a range of between about 50 microns and about 4000 microns, said composition being free of silica filler and treated silica filler, and wherein weight ratios of polymer B to polymer A are in the range of about 1:1 to about 5:1.

23. The method according to claim 1 wherein said powder has a mean particle size in a range of between about 50 microns and about 4000 microns.

24. The composition according to claim 12 wherein said powder has a mean particle size in a range of between about 50 microns and about 4000 microns.

25. The method according to claim 1 wherein weight ratios of polymer B to polymer A are in the range of about 1:1 to about 5:1.

26. The composition according to claim 12 wherein weight ratios of polymer B to polymer A in the range of about 1:1 to about 5:1.

* * * * *